June 11, 1929.   G. W. HULSHIZER   1,716,443
CHUCK FOR ROCK DRILLS
Filed Dec. 16, 1927
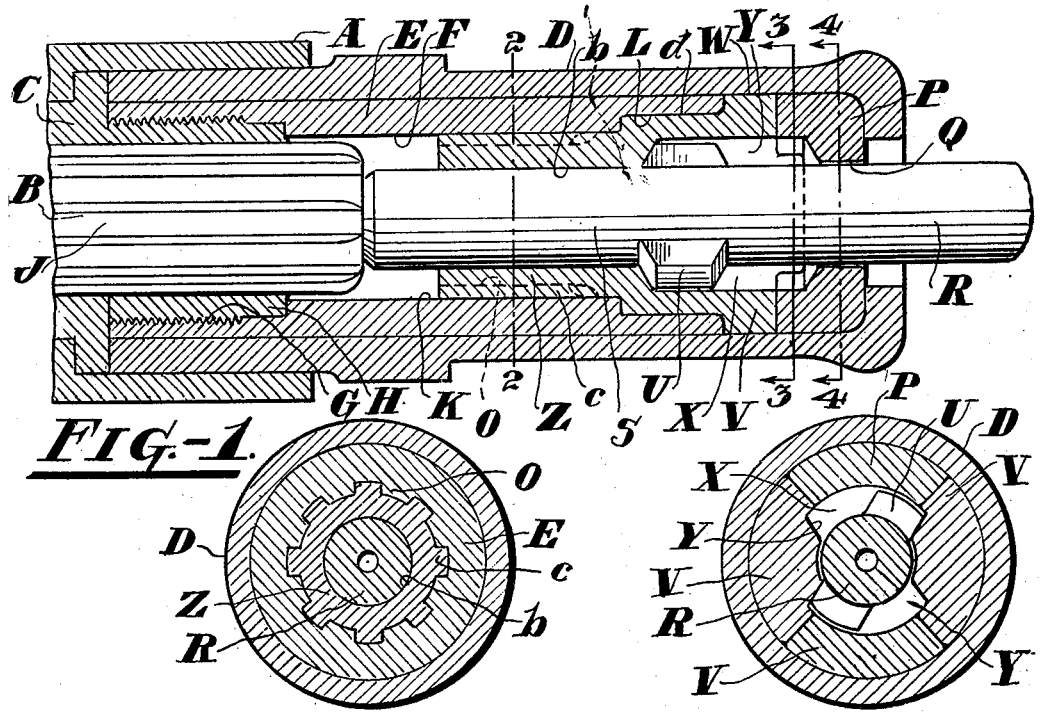
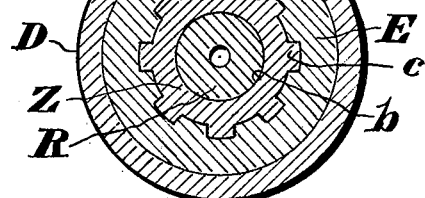
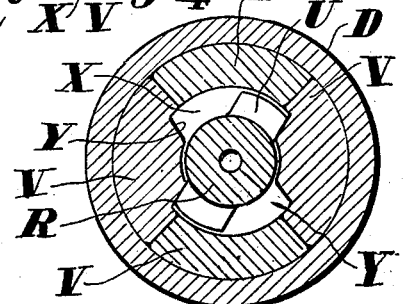
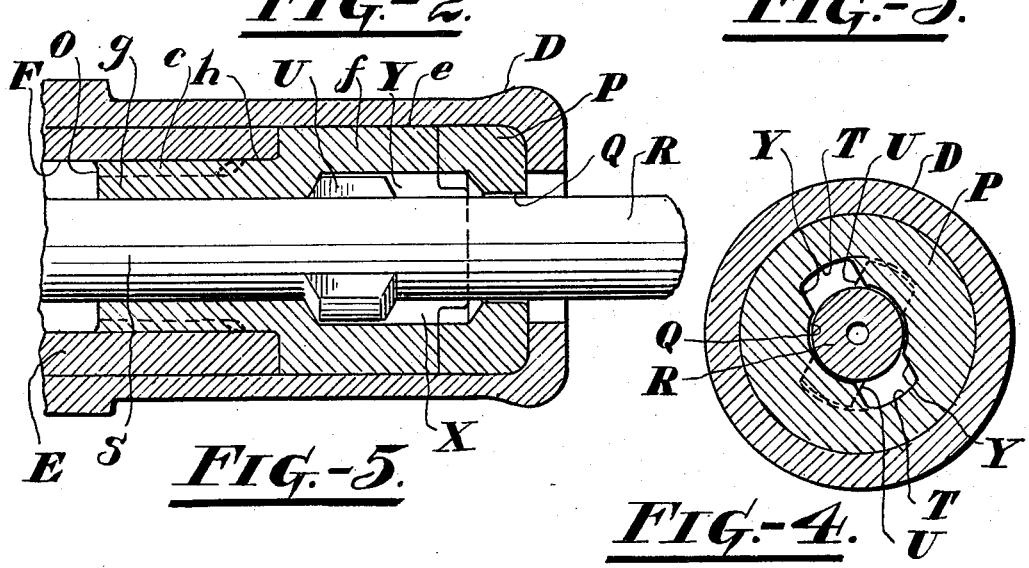
INVENTOR.
George W. Hulshizer
BY
HIS ATTORNEY Patented June 11, 1929.

1,716,443

UNITED STATES PATENT OFFICE.

GEORGE W. HULSHIZER, OF STEWARTSVILLE, NEW JERSEY, ASSIGNOR TO INGERSOLL-RAND COMPANY, OF JERSEY CITY, NEW JERSEY, A CORPORATION OF NEW JERSEY.

CHUCK FOR ROCK DRILLS.

Application filed December 16, 1927. Serial No. 240,456.

This invention relates to rock drills, but more particularly to chuck mechanism for fluid actuated rock drills of the hammer type.

The objects of the invention are to lengthen the life of service of the parts comprising the chuck mechanism, to reduce the expense of maintaining these parts and to render them strong and durable and better able to withstand the severe usage to which they are subjected.

Other objects of the invention will be in part obvious and in part pointed out hereinafter.

In the drawings showing a practical application of the invention,

Figure 1 is a longitudinal sectional view of so much of a rock drill as will serve to illustrate the invention, Figures 2, 3 and 4 are transverse views taken through Figure 1 showing various details of the invention, and Figure 5 is a view similar to Figure 1 showing a modification of the invention.

Referring more particularly to the drawings, A represents the front end of a rock drill cylinder in which is disposed a hammer piston B guided at its front end by a bushing C disposed in the cylinder A.

A front head D projects with its rearward end into the front end of the cylinder A and may be held in operative position with respect to the cylinder A by means of the usual spring pressed side bolts (not shown).

In accordance with the practice of the invention, a chuck E of less length than the front head D is disposed within the front head and has a bore F in the rearward end of which are formed internal threads G to receive a threaded chuck bushing H. The chuck bushing H may be of a well known type provided with suitable ribs (not shown) to interlock slidably with flutes J in the forward portion of the hammer piston B to prevent relative rotation between the hammer piston and the chuck E. The bore F comprises an intermediate reduced portion K and a forward enlarged portion L and in the front end of the reduced portion K of the bore F are a plurality of ribs O.

Disposed in the front end of the front head is a chuck key P having a central bore Q to receive a working implement R which extends with its shank S rearwardly into the bore F to receive the blows of the hammer piston B.

On opposite sides of the central bore Q of the chuck key P are formed recesses T to permit the passage of lugs U on the implement R through the chuck key P.

Suitable means are provided for preventing relative rotation between the working implement R and the chuck E. The means in this instance consist of a chuck jaw V which may be clutched to the chuck key P in a well known manner and has a forward portion W of substantially the same diameter as the chuck E and the chuck key P between which parts this portion W is interposed. In the forward portion of the chuck jaw V is formed a cavity X to accommodate the lugs U of the working implement R and in this cavity X are formed key portions or lugs Y adapted to interlock with the lugs U on the working implement. The cavity X is preferably of such depth as to permit of limited reciprocation of the lugs U therein.

Formed integrally with the chuck jaw V is an extension Z which extends into the reduced portion K of the bore F and has a bore $b$ to slidably receive the shank S of the working implement. On the outer surface of the extension Z are formed longitudinal ribs $c$ which interlock with the ribs O for preventing rotation of the chuck jaw V with respect to the chuck E.

In order to assure coaxial alignment of the chuck jaw V with the chuck E said chuck jaw V is provided with a plain cylindrical portion $d$ intermediate the portion W and the extension Z to cooperate slidably with the enlarged portion L of the bore F.

The modification illustrated in Figure 5 is in principle like that shown in Figures 1 to 4 inclusive. The distinguishing feature of this modification is that the forward cylindrical portion $e$ of the chuck jaw $f$ is of a length somewhat in excess of the cavity X, thus affording a wide area of contact between the chuck jaw and the front head. The chuck jaw $f$ has only one reduced portion in the form of an extension $g$ whereon are formed the ribs $c$ to engage the ribs O of the chuck E. Between the ribs $c$ and the enlarged portion $e$ is a plain cylindrical surface $h$ which fits slidably into the front end of the chuck E to hold the chuck and the chuck jaw in axial alignment with respect to each other.

Heretofore in devices of this character the usual practice has been to form the chuck jaw as an integral part of the chuck, a separate bushing being inserted in the chuck to act as a guiding means for the shank of the working implement. In such structures, when those parts of the chuck which were most subjected to wear became unfit for use it became necessary to discard the entire chuck mechanism and renew the same at an expense greatly in excess to that which would have been incurred had it been possible to replace only those parts which actually became unfit for use. As will be readily observed the parts which are most subjected to wear are the chuck jaw and the bushing, in other words, the parts which are in actual contact with the working implement. The present invention obviates these disadvantages and eliminates the necessity of discarding the entire chuck device. This may be accomplished by merely removing the chuck jaw and replacing same whenever it becomes necessary to do so. The expense of such renewal is small as compared with devices in which the entire chuck mechanism requires replacement in the event of excessive wear on or breakage of a portion thereof.

Among the advantageous features of the present invention, that of centralizing the chuck jaw with respect to the chuck E is highly desirable in structures of this type since it prevents any relative transverse movement between these parts and consequently reduces the chances of shattering of the chuck elements.

I claim:

1. In a rock drill, the combination of a front head and a hollow chuck, ribs in the chuck, a chuck jaw adapted to interlockingly engage a working implement, an extension on the chuck jaw extending into the chuck, said extension having a bore to slidably receive the shank of such implement, ribs on the extension interlocking with the ribs in the chuck to prevent relative rotation between the chuck and the chuck jaw, and a plain cylindrical portion on the chuck jaw projecting into the chuck to maintain the chuck, chuck jaw and front head in relative axial alignment.

2. In a rock drill, the combination of a front head and a chuck, said chuck having a bore comprising an enlarged portion and a reduced portion, ribs in the reduced portion of the bore, a chuck jaw adapted to interlockingly engage a working implement, an extension integral with the chuck jaw projecting into the bore, ribs on the extension interlocking with the ribs in the chuck for preventing relative rotation between the chuck and the chuck jaw, said extension being hollow to slidably receive the shank of a working implement, and a plain cylindrical portion on the chuck jaw extending into the enlarged portion of the bore to maintain the chuck and chuck jaw in relative axial alignment.

In testimony whereof I have signed this specification.

GEORGE W. HULSHIZER.